Figure 1:
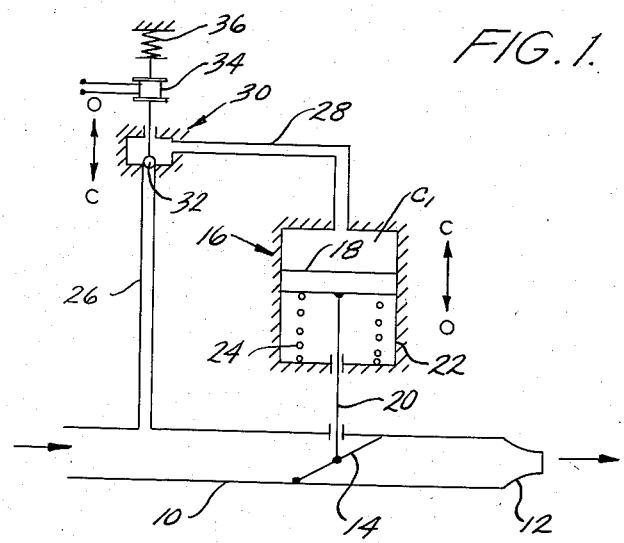

Dec. 13, 1960

T. P. FARKAS 2,964,287

FAST ACTING VALVE

Filed Jan. 14, 1959

INVENTOR.
THOMAS P. FARKAS
BY
Teller & McCormick
ATTORNEYS

സ2,964,287

Patented Dec. 13, 1960

2,964,287

FAST ACTING VALVE

Thomas P. Farkas, Bloomfield, Conn., assignor to United Aircraft Corporation, East Hartford, Conn., a corporation of Delaware Filed Jan. 14, 1959, Ser. No. 786,799

6 Claims. (Cl. 251—31)

This invention relates to an improved valve of the type which is remotely controlled for operation generally with compressible fluids, the valve being moved between open and closed positions by fluid pressure.

Valves heretofore used in the same installations have had one well known disadvantage. That is, they have been capable of fast action in only one direction of movement, either opening or closing.

It is a principal object of this invention to provide a valve of the type referred to which is fast acting in both the opening and closing directions so that the valve may be called a "fast acting on-off valve."

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 2:
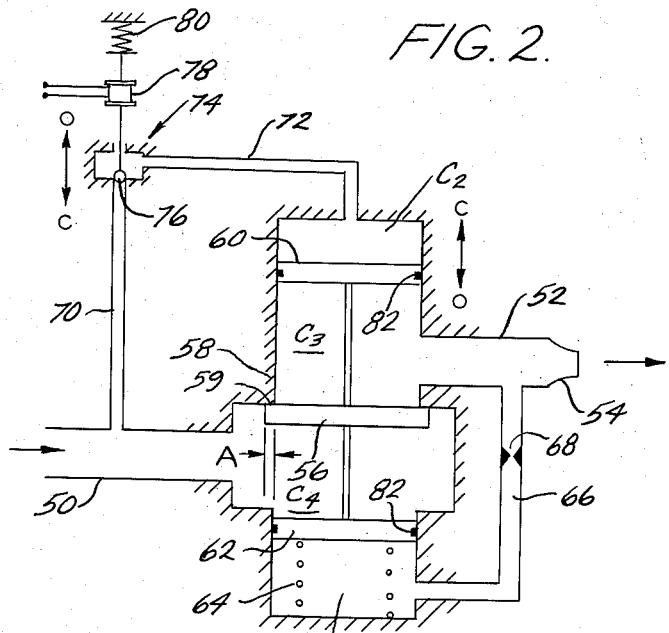

Of the drawing:

Fig. 1 is a schematic illustration of a known valve of the general type to which this invention relates, and the valve is shown to demonstrate a principal disadvantage thereof; and Fig. 2 is a schematic view of a valve provided in accordance with the present invention to overcome the said principal disadvantage of the valve shown in Fig. 1.

The essential problem solved in this invention is the provision of a fast acting valve which will open and close a conduit or passage accommodating flow of a high pressure fluid and wherein the valve is operated by a compressible fluid and is remotely controlled. The problem is illustrated in Fig. 1 wherein there is shown a large diameter conduit 10 for the flow of a high pressure fluid from a source (not shown) to a nozzle 12 or other instrumentality utilizing the fluid and wherein its pressure is usually dissipated.

Now, there are known fast acting valves which might be used in the conduit 10 to open and to close the same, but for various reasons cannot be used. For example, a remotely controlled solenoid operated valve might be used in the conduit, but this would be quite undesirable because of the weight involved in the construction of the valve and its solenoid if the conduit is a component of an aircraft air conditioning system. Therefore, it has heretofore been found desirable to provide a valve such as that indicated at 14 which is operated by a fluid pressure actuator 16.

The actuator 16 comprises a piston 18 which is connected as by a link 20 to the valve 14, the piston being disposed in a suitable housing 22 and biased in one direction as by a spring 24. For illustration, the piston 18 is shown biased in the valve closing direction, but the opposite effect could be achieved if desired. In this instance the piston 18 and valve 14 are moved in the valve opening direction by fluid pressure in a chamber C1 in the housing 22. While any source of fluid under pressure may be used, it is most convenient to use the fluid under pressure in the conduit 10 on the upstream side of the on-off valve 14. As shown, passage means 26, 28 connects the conduit 10 and the chamber C1, and a pilot or control valve 30 is disposed in the conduit means to control flow therethrough and thus to control operation of the valve 14.

The control valve 30 comprises a ball check 32 which is operated by a solenoid 34 to move from a first position (as shown) closing the passage means 26, 28 and venting the chamber C1 to a second position opening the said passage means while closing the chamber vent. The ball check is biased as by a spring 36 to the said first position, but the opposite effect can be achieved if desired.

The disadvantage encountered in operation of the aforedescribed construction can easily be demonstrated by assuming realistic pressure conditions, etc. That is, if a valve-upstream or inlet pressure of 1000 p.s.i. is assumed present in the conduit 10 and if the valve actuating spring is assumed to exert a force equivalent to 20 p.s.i. on the piston 18, it will be seen that the valve 14 will be quick to open when the solenoid 34 is energized. The fast opening action occurs because little time is lost in building up pressure in the chamber C1 in excess of the 20 p.s.i. biasing force of the spring. However, the valve 14 is slow closing when the control valve solenoid 34 is deenergized. That is, much time is lost in venting the chamber C1 from a pressure of approximately 1000 p.s.i. to a pressure below 20 p.s.i.

One solution to the problem is to make the vent portion 28 of the passage means 26, 28 of large diameter and to provide a large area vent opening in the control valve 30. This, however, would require a larger and heavier solenoid for operating the ball check valve 32 and would be impractical in aircraft where weight and size are important factors.

The disadvantage referred to is overcome in accordance with the present invention in operation of the construction shown in Fig. 2. Here again conduit means comprising an inlet 50 and an outlet 52 are provided to accommodate flow of fluid from left to right from a suitable source to an instrumentality such as a nozzle 54 wherein the pressure is generally dissipated. A valve 56, preferably of the poppet type, is disposed in the conduit means selectively to open and to close passage therethrough.

The valve 56 is located in suitable housing means 58, and like the known valve of Fig. 1 it is moved toward open position by fluid under pressure and it is biased toward closed position (wherein it engages a seat 59 defined in the housing between the inlet and outlet) by a spring. (As will be explained hereinafter, the spring is not essential to the construction.) More specifically, the valve 56 is preferably formed as part of a valve spool with oppositely disposed end pistons 60 and 62 which are movable in the housing means 58. A chamber C2 is defined in the housing means at one end of the spool and fluid under pressure within this chamber urges the valve toward open position. Chambers C3 and C4 are defined between the valve 56 and the end pistons 60 and 62, respectively, and a chamber C5 is defined at the other end of the spool and receives a spring 64 which biases the spool and valve toward closed position. The chambers C3 and C4 may be referred to as outlet and inlet chambers, because the outlet and inlet portions of the conduit means 50, 52 are respectively connected thereto, while the chamber C5 may be referred to for obvious reasons as a spring chamber. The valve-closing force of the spring is assisted by fluid under pressure introduced to the spring chamber C5 from the conduit means 50, 52 on the downstream side of the valve 56 through a passage 66 containing a restriction 68 which prevents abrupt pressure changes in the chamber C5 accompanying pressure changes in the downstream end of the said conduit means. It can be said that the restriction provides means for delaying the introduction and dissipation of pressure in the chamber C5.

As in the known valve, the pressure used in opening the valve 56 is derived from the fluid at the inlet on the upstream side of the conduit means, this being accomplished by passage means 70, 72 connecting the conduit means and the actuating chamber C2. A solenoid operated control or pilot valve 74 is disposed in the passage means and includes a ball check 76 which is operated by a solenoid 78 to open the passage means 70, 72 while closing a vent for the chamber C2 and which is biased by a spring 80 to close the passage means while opening the vent. The opposite effect can, of course, be achieved if desired so as to close the valve 56 in the first mentioned position of the control valve and to open it in the second mentioned position.

In constructing the valve 56 it is preferably made of slightly greater area than the pistons 60 and 62 which are preferably of equal area. The difference in area between the valve and the pistons may be approximately 0.1 of the area of the valve and this increment is designated in Fig. 2 by the letter A. Pressure applied to this increment of valve area assists in retaining the valve in the seated or closed position as will be more fully understood in the following description of operation.

Assume that the control solenoid 79 is not energized and that no fluid under pressure is being admitted to the conduit means 50, 52. Under such conditions, the control valve 74 and the main valve 56 will be positioned as shown in Fig. 2, the valve 56 being biased to such position by the spring 64 and there being no fluid pressure acting on either side of the said valve or its pistons 60 and 62. The spring may exert a force on the piston 62 equivalent to 20 p.s.i. Assume further that the valve 56 has an area of 0.3 in.² and that the pistons 60 and 62 are each 0.27 in.² in area.

Now assume that a fluid under 1000 p.s.i. pressure is introduced to the conduit means at 50. This will subject the inlet chamber C4 to 1000 p.s.i. pressure causing a net upward force on the valve 56 equal to 1000×A or 1000×0.03=30 lbs. The total closing force on the valve is thus 30+(0.27×20)=35.4 lbs. All elements of the construction will remain as shown in Fig. 2.

Now, if it is desired to open the valve 56, this is done by energizing the solenoid 78 to move the ball check 76 to close the vent and provide flow from the conduit means to the actuating chamber C2. Pressure will rapidly build up in the said actuating chamber and it need reach only approximately 135 p.s.i. to open the valve 56 against the 35.4 lbs. force holding it closed. Since the chamber is receiving fluid from a 1000 p.s.i. source, there obviously will be little delay in opening the valve. Therefore, the valve can be said to be quick opening.

The quick opening movement of the valve is enhanced by reducing the pressure differential across the valve or from the chamber C4 to the chamber C3. At the outset this pressure differential is 1000 p.s.i., but immediately the valve starts to open, pressure increases in the chamber C3 and the aforesaid pressure drop is reduced. The reduced pressure differential applied over the valve area A reduces the total force tending to hold the valve 56 closed.

When the valve 56 is fully opened, the pressure drop across it or from the inlet chamber C4 to the outlet chamber C3 will be reduced to a minimum. In a practical example, the pressure drop may be of the order of 50 p.s.i. Thus the pressure in the chamber C3, the portion 52 of the conduit means, and in the chamber C5 may reach as much as 950 p.s.i. In the said practical example, the force tending to hold the valve 56 open is created by a pressure unbalance of 50 p.s.i., there being 1000 p.s.i. in chamber C2 and 950 p.s.i. in chamber C5. The force tending to close the valve 56 is that of the spring 64 having an equivalent of 20 p.s.i. Accordingly, the valve is held open with a force equivalent to 30 p.s.i. applied as to the piston 60.

Actually, the spring 64 is not needed in the construction and there is an advantage in deleting it. That is, with the spring removed, the pressure drop across the valve can be reduced to zero and there will be no net force tending to hold the valve open or tending to close it. However, the valve will not inadvertently move from its open position due to friction between O ring seals 82, 82 on the pistons 60 and 62 and the interior walls of the housing 58. Furthermore, the friction between the seals and the housing permit reducing the pressure differential across the valve 56 somewhat below 20 p.s.i. even if a 20 p.s.i. spring 64 is used, because such friction will prevent closing of the valve with the spring force.

Whether or not a spring 64 is used in the construction, the fluid pressure in the chamber C5 is used in closing the valve 56 when valve closing is desired. That is, when the control valve is positioned as shown in Fig. 2, to vent the chamber C2, the pressure in the chamber C5 closes the valve. The pressure in chamber C2 need be reduced only to the point where the differential of pressure between it and the pressure in chamber C5 has a force equivalent (which may be assisted by the spring 64) sufficient to overcome the valve friction. Obviously, the pressure differential will quickly reach the required level for valve-closing movement, so it can be said that the valve is fast acting to close.

Now, as the valve 56 closes, the pressure in the chamber C3 and in the outlet portion 52 of the conduit means reduces rather rapidly. However, this reduction in pressure is not immediately felt in the closing chamber C5 because of the restriction 68 in the passageway 66. Therefore, there is always sufficient pressure in the chamber C5 to assure complete closing of the valve 56, and, preferably, the chamber C5 is made quite large so that the pressure drop occasioned therein by closing the valve is relatively small.

The fast closing action of the valve 56 is enhanced by the reduction in pressure in the outlet chamber C3 and the consequent increase in the differential between the chambers C4 and C3. This differential applies to the valve area A to force the valve in the closing direction and when the valve is completely closed the differential (1000 p.s.i.) holds the valve closed with or without the spring 64.

The invention claimed is:

1. A fast acting valve structure comprising a housing having an inlet and an outlet for the passage of fluid under pressure, a valve spool axially reciprocable in said housing including a valve disposed between its ends selectively to permit and to prevent flow between the inlet and the outlet, the spool being arranged to move in one axial direction to open the valve and in the other axial direction to close the valve, means for selectively introducing and for removing fluid pressure in the housing at one end of the spool whereby respectively to open and to close the valve, means for introducing fluid under pressure from said outlet to the housing at the other end of the spool to provide force for closing the valve, and means for delaying the introduction and dissipation of fluid pressure at said other end of the spool to assure full opening and closing movements of the valve when introducing and removing fluid under pressure at said one end of the spool.

2. A fast acting valve structure comprising a housing having an inlet and an outlet for the passage of fluid under pressure, a valve spool axially reciprocable in said housing including a valve disposed between its ends selectively to permit and to prevent flow between the inlet and the outlet, the spool being arranged to move in one axial direction to open the valve and in the other axial direction to close the valve, means for selectively introducing fluid under pressure from the inlet to the housing at one end of the spool and for removing fluid pressure therefrom respectively to open and to close the valve, means for introducing fluid under pressure from said outlet to the housing at the other end of the spool to provide force for closing the valve, and means for delaying the introduction and dissipation of fluid pressure at said other end of the spool to assure full opening and closing movements of the valve when introducing and removing fluid under pressure at said one end of the spool.

3. A fast acting valve structure comprising a housing having an inlet and an outlet for the passage of fluid under pressure and having a valve seat disposed between the inlet and the outlet, a valve spool axially reciprocable in said housing and including a valve disposed between its ends and engageable with the seat, the spool being arranged to move in one axial direction to open the valve and to move in the other axial direction to seat or close the valve, means for selectively introducing and for removing fluid pressure in the housing at one end of the spool whereby respectively to open and to close the valve, means for introducing fluid under pressure from said outlet to the other end of the spool to provide the valve closing force, and means for delaying the introduction and dissipation of fluid pressure at said other end of the spool to assure full opening and closing movements of the said valve when introducing and removing fluid under pressure at said one end of the spool.

4. A fast acting valve structure comprising a housing having an inlet and an outlet for the passage of fluid under pressure and having a valve seat disposed between the inlet and the outlet, a valve spool axially reciprocable in the housing including a pair of substantially equal area end pistons and a larger area valve disposed between the end pistons which valve is engageable with the seat, the spool being arranged to move in one axial direction to open the valve and in the opposite direction to seat or close the valve and with the valve and one side of one end piston at all times exposed to fluid under pressure at said inlet which fluid pressure applied to the greater valve area retains the valve in position when seated, means for selectively introducing and for removing fluid under pressure in the housing at one end of the spool whereby respectively to open and to close the valve, means for introducing fluid under pressure from said outlet in the housing at the other end of the spool to act on the other side of said one end piston to provide the valve closing force, and means for delaying the introduction and dissipation of fluid pressure at said other end of the spool to assure full opening and closing movements of the said valve when introducing and removing fluid under pressure at said one end of the spool.

5. A fast acting valve structure comprising a housing having an inlet and an outlet for the passage of fluid under pressure and having a valve seat disposed between the inlet and the outlet, a valve spool axially reciprocable in the housing including a pair of substantially equal area end pistons and a larger area valve disposed between the end pistons which valve is engageable with the seat, the spool being arranged to move in one axial direction to open the valve and in the opposite direction to seat or close the valve and with the valve and one side of one end piston at all times exposed to fluid under pressure at said inlet which fluid pressure applied to the greater valve area retains the valve in position when seated, means for selectively introducing fluid under pressure from the inlet to the housing at one end of the spool and for removing pressure therefrom respectively to open and to close the valve, means for introducing fluid under pressure from said outlet in the housing at the other end of the spool to act on the other side of said one end piston to provide the valve closing force, and means for delaying the introduction and dissipation of fluid pressure at said other end of the spool to assure full opening and closing movements of the said valve when introducing and removing fluid under pressure at said one end of the spool.

6. A fast acting valve structure comprising a housing having an inlet and an outlet for the passage of fluid under pressure and having a valve seat disposed between the inlet and outlet, a valve spool axially reciprocable in the housing including a pair of substantially equal area end pistons and a larger area valve disposed between the end pistons which valve is engageable with the seat, the spool being arranged to move in one axial direction to open the valve and in the opposite direction to seat or close the valve and with the valve and one side of one end piston always exposed to fluid under pressure at said inlet which fluid pressure applied to the greater valve area retains the valve in position when seated, passage means interconnecting the inlet and the housing at one end of the spool, a control valve disposed in said passage means for selectively introducing fluid at inlet pressure to the housing at said one end of the spool and for removing fluid pressure therefrom respectively to open and to close the spool valve, means defining a passage between the outlet and the housing at the other end of the spool to introduce fluid thereto at outlet pressure to act on the other side of said one end piston to provide the closing force for the spool valve, and means defining a restriction in said passage to delay the introduction and dissipation of fluid pressure at said other end of the spool to assure full opening and closing movements of the spool valve when introducing and removing fluid under pressure at said one end of the spool.

References Cited in the file of this patent

UNITED STATES PATENTS

| 1,205,898 | Jones | Nov. 21, 1916 |
| 1,986,429 | Dunham | Jan. 1, 1935 |

FOREIGN PATENTS

| 5,632 | Great Britain | of 1910 |
| 612,527 | France | of 1926 |